United States Patent [19]
Sorenson et al.

[11] Patent Number: 5,810,172
[45] Date of Patent: Sep. 22, 1998

[54] METHODS FOR RECYCLING FLUSH WATER AND WASTE SOLIDS IN A WOOD PANEL FABRICATION PROCESS

[76] Inventors: Blaine F. Sorenson, 18813 SE. Lakehome Rd., Auburn, Wash. 98002; Gary A. Raemhild, 2325 43rd Ave. E., Seattle, Wash. 98112

[21] Appl. No.: 388,958

[22] Filed: Feb. 15, 1995

[51] Int. Cl.⁶ .............................. B03B 9/00; B01D 37/02
[52] U.S. Cl. .......................... 209/2; 209/17; 210/195.2; 210/196; 210/257.2; 210/259; 210/388; 210/636; 210/650; 210/651; 210/805; 210/806; 162/55; 162/162; 162/251
[58] Field of Search .............................. 210/195.2, 257.2, 210/258, 388, 636, 136, 650, 651, 805, 806; 162/55, 162, 251; 209/2, 17

[56] References Cited

U.S. PATENT DOCUMENTS

| | | | |
|---|---|---|---|
| 3,220,546 | 11/1965 | Gardner | 209/7 |
| 3,897,301 | 7/1975 | Bauman et al. | 162/189 |
| 3,973,987 | 8/1976 | Hewitt et al. | 134/12 |
| 4,427,551 | 1/1984 | Duveau | 210/741 |
| 4,525,278 | 6/1985 | Frost, III | 210/638 |
| 4,571,301 | 2/1986 | Inskeep, Jr. | 210/788 |
| 4,578,253 | 3/1986 | Gill et al. | 423/87 |
| 4,629,568 | 12/1986 | Ellis, III | 210/636 |
| 4,784,771 | 11/1988 | Wathen et al. | 210/636 |
| 4,935,149 | 6/1990 | Morse | 210/712 |
| 4,943,379 | 7/1990 | Boze et al. | 210/778 |
| 4,983,301 | 1/1991 | Szucz et al. | 210/636 |
| 5,002,633 | 3/1991 | Maxham | 162/5 |
| 5,043,071 | 8/1991 | Anselme et al. | 210/636 |
| 5,108,626 | 4/1992 | Lees et al. | 210/785 |
| 5,285,903 | 2/1994 | Sorenson | 209/2 |

FOREIGN PATENT DOCUMENTS 284041  4/1982  United Kingdom .

OTHER PUBLICATIONS

Desal Application Bulletin, Desal–5 102, 103, 104, 105, 106, 107, Apr. 1991; Desal Application Bulletin, Desal–5 108,.

Feb. 1989; Desal Application Bulletin, Desal–5 109, Apr. 1991, Desal Application Bulletin, Desal–5 110, Jun. 1991.

*Primary Examiner*—Leszek Kiliman
*Attorney, Agent, or Firm*—Stratton Ballew PLLC

[57] ABSTRACT

A method for recycling contaminated flush water from a wet electrostatic precipitator emission control system in a wood panel fabrication process. The recycled flush water containing solid byproducts from the emission control system is combined with wood products in a wood panel fabrication mix in a predetermined ratio of flush water to wood products, resulting in a finished wood panel having improved internal bond strengths and formaldehyde scavenging capacity without the need for excess binding resins and formaldehyde scavengers.

12 Claims, 1 Drawing Sheet

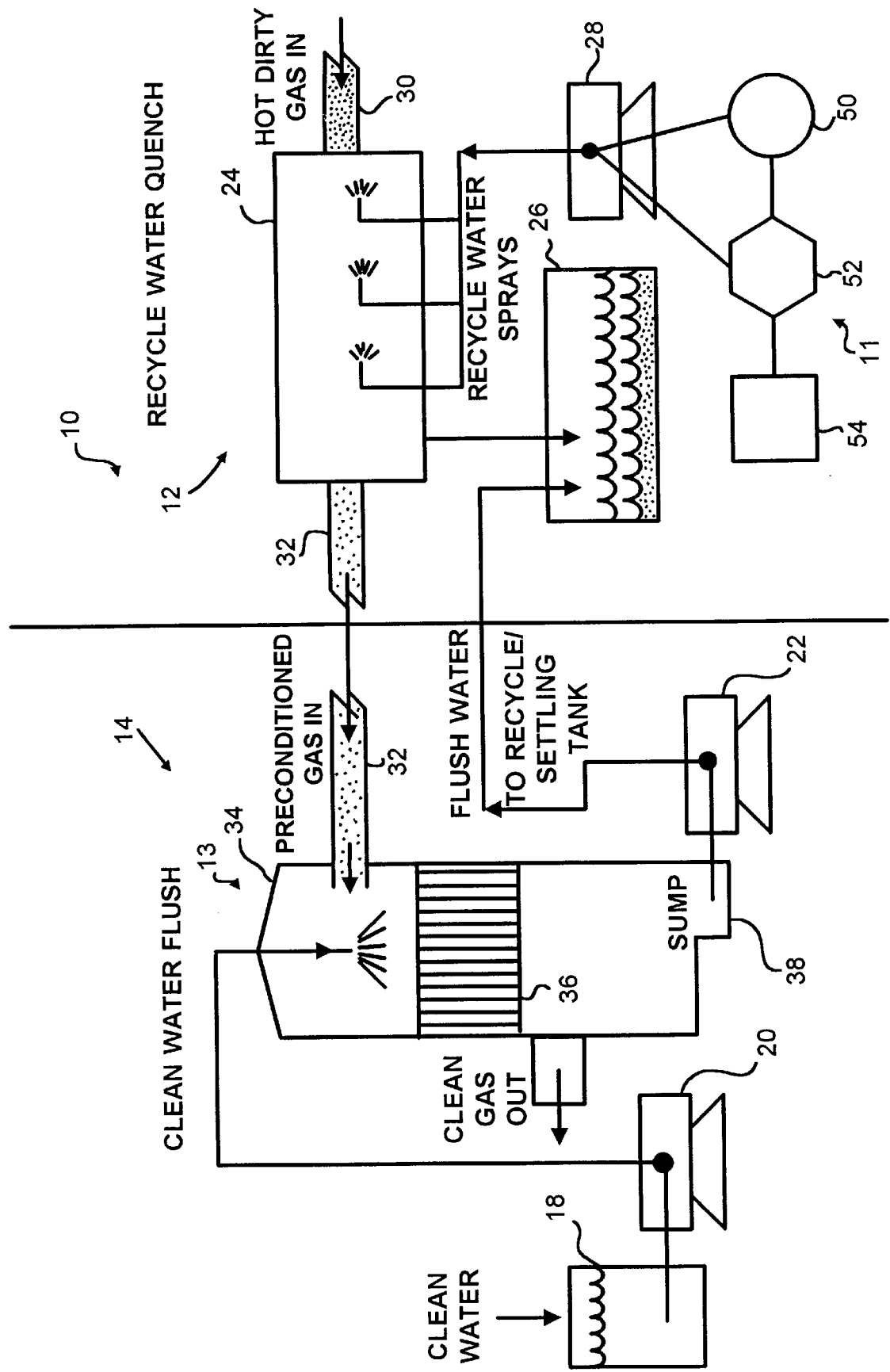

METHODS FOR RECYCLING FLUSH WATER AND WASTE SOLIDS IN A WOOD PANEL FABRICATION PROCESS

FIELD OF THE INVENTION

The invention relates to flush water treatment methods involved in wood panel fabrication processes. More specifically, the invention relates to methods for controlling flush water output from a wood panel fabrication process. In addition, the invention relates to wood panels fabricated using processed wood products and compositions for fabricating wood panels.

BACKGROUND OF THE INVENTION

Wood panel fabrication using processed wood products (e.g., furnish, wood flakes, raw material) involves steps of drying the wood product, combining and mixing constituent materials (i.e., wood product, resin, wax and scavenging agents), then pressing the materials into a panel. The output is wood panel (i.e., particle board, plywood, oriented strand board, medium density fiberboard).

During the wood product drying operation, byproducts, including wood ash, fibers and, semi-solids, and liquids are generated. Such materials are captured by an air pollution control system and collected in a recycling water stream. The liquids and semisolids include hydrocarbons and other organic molecules. In one known process, byproduct gasses are first conditioned with water sprays to achieve adiabatic saturation. As a result, the gas is cooled to the necessary level for hydrocarbon vapors to condense. The fibers, semi-solids and liquids, including hydrocarbon droplets, then are collected by a precipitator and discharged into a recycling water stream. The Figure shows a block diagram of a flush water recycling system 10. Included in the Figure is a wet electrostatic precipitator 13, also described in U.S. Pat. No. 4,194,888. Recycled water from the settling tank 26 is sprayed via pump 28 into the chamber 24 conditioning and cooling the gas stream to achieve adiabatic saturation. Spray nozzles with a large orifice diameter quench the gas stream by producing large diameter droplets. Such large droplets are unlikely to evaporate completely, thereby creating spray-dried particulate. The large nozzles also are less likely to clog. The spent quench water is drained to the settling tank 26 for treatment and disposal.

Typically, the solids accumulated in the settling tank 26, then are removed by surface skimmers', bottom drag chains, aeration/flotation devices, or filters. Due to the large percentage of liquid material captured with the solids, waste disposal is difficult. The collected waste typically is disposed of by burning in a wet burner or boiler, or by storage in a landfill. Transporting the waste and storing the waste in a landfill is difficult when the waste includes liquid (i.e., 75% to 85% by weight). Accordingly, there is a need to find clean functional uses for the byproduct and to reduce the portions discarded as waste.

Another problem with conventional water treatment systems used for wood panel fabrication processes is that the hydrocarbons tend to stay in solution. Previously, the hydrocarbons have been removed from the water treatment system by disposing of the waste water at rates of several gallons per minute. Simple disposal of such water is undesirable. Further, government regulations for discharging waste water are becoming more restrictive. Accordingly, there is a need to reduce the hydrocarbons in solution within the recycling water stream and a need to achieve higher concentrations of solids thereby reducing the volume of material and making handling of the material easier.

SUMMARY OF THE INVENTION

The invention provides methods for recycling contaminated flush water and byproducts contained therein produced during a wood panel fabrication process. Specifically, the invention provides methods for recycling contaminated flush water from a wood panel fabrication process, the flush water containing solids, including wood fiber and semi-solids, and hydrocarbons. The flush water is produced from an emission control system in which a water stream collects the byproduct to form the contaminated flush water.

The recycling method involves diverting a contaminated flush water stream from the emission control system, and channeling the diverted flush water stream into a pre-fabrication component of a wood panel fabrication facility. Subsequently or simultaneously, the diverted flush water is combined with dried wood product in the pre-fabrication component in a pre-determined ratio of flush water to wood product to form a novel flush water/wood product mixture useful for producing wood panels having enhanced formaldehyde scavenging and internal bonding characteristics compared to the dried wood product alone. In an alternate embodiment of the invention, the flush water/wood product mixture is combined with other wood panel constituent materials and pressed to form a fabricated wood panel.

In a related embodiment of the invention, compositions are provided for use in the production of fabricated wood panels made from processed wood products. The composition includes contaminated flush water containing byproduct of a wood panel fabrication process. More specifically, the flush water contains solids, including wood fiber and semi-solids, and hydrocarbons. In addition to the flush water, the composition also includes dried wood product mixed with the contaminated flush water in a pre-determined ratio of flush water to dried wood product, to form a flush water/wood product mixture having enhanced formaldehyde scavenging and internal bonding characteristics compared to the dried wood product alone.

These and other aspects of the invention also result in an improved wood panel. The invention will be better understood by reference to the following detailed description taken in conjunction with the accompanying drawings.

BRIEF DESCRIPTION OF THE DRAWING

The Figure is a block diagram of a flush water recycling system coupled with a wood panel fabrication system, employing the concepts of the invention.

DETAILED DESCRIPTION OF THE INVENTION

According to conventional water treatment methods, flush water and byproduct generated by emission control systems in wood panel fabrication processes have always been discarded as useless, and costly to dispose of, waste materials. Using the methods and compositions of the present invention, the costs of disposal of these waste products are eliminated, and the flush water and contaminating byproduct are instead recycled as constituent materials in the fabrication of wood panels. Use of the flush water and byproduct in the fabrication process provides many benefits in addition to decreased disposal costs, including increased mill capacity, decreased water use, and a higher quality wood panel product using fewer commercially provided constituent materials. More specifically, the press time for wood panels is reduced by approximately 5%. For example, the press time for wood panels formed from Douglas fir and Redwood trees showed an approximately 5% decrease. As a result, mill capacity can be increased by 5%. Further, the flush water and byproduct serves as a formaldehyde scavenger to reduce formaldehyde emissions from completed wood panels. In addition, recycling of the flush water and byproduct eliminates the need to use excessive amounts of water and to dispose of large volumes of waste water containing hydrocarbons. Lastly, the flush water serves as a resin extender, providing for improved internal bonding characteristics of constituents used to make the wood panels, whereby stronger panels can be made using fewer outside raw materials, such as resins.

In a basic embodiment of the invention, methods are provided for recycling contaminated flush water generated from a wood panel fabrication process. Referring to the Figure, the flush water is produced from an emission control system 10 in which a water stream collects flush water and contaminating byproduct generated during a wood product drying operation, byproducts including (i) fibers, such as wood ash and wood particles, (ii) semi-solids, including fillers, and (iii) liquids are generated. Such materials are captured by an air pollution control system and collected in a recycling water stream. The liquids and semisolids include hydrocarbons and other organic molecules. In one known process, byproduct gasses are first conditioned with water sprays to achieve adiabatic saturation. As a result, the gas is cooled to the necessary level for hydrocarbon vapors to condense. The fibers, semi-solids and liquids, including hydrocarbon droplets, then are collected by a precipitator and discharged into the recycling water stream. Removal of the hydrocarbons is especially important when drying resinous species such as Southern Yellow pine or Douglas fir. If not condensed and collected as a droplet, the vapors will condense when discharged to the atmosphere forming a blue haze plume (often characterizing wood drying emissions).

The Figure shows a block diagram of a flush water recycling system 10 coupled with a wood panel fabrication system 11, employing the concepts of the invention. Included in the Figure is a wet electrostatic precipitator 13, also described in U.S. Pat. No. 4,194,888. The system 10 includes a "first" recycle water quench stage 12 and a "second" clean water flush stage 14. The recycle quench stage 12 includes a preconditioning chamber 24, settling tank 26 and pump 28. The clean water flush stage 14 includes the wet electrostatic precipitator 13, a flush tank 18, and pumps 20, 22. The precipitator 13 employs a high-intensity ionization electrode configuration which concentrates a charging field in a zone between a disc and a collection tube. The geometry enables formation of a stable, high intensity electrostatic field. Particle charging of 20 kv per inch are maintained with minimal sparking. An ensuing migration velocity results in a desirably high particulate collection efficiency.

The first stage 12 of the precipitator receives hot dirty gas, including hydrocarbons, and fibers from the drying wood panel, which enter the first stage via the pre-conditioning chamber 24 at inlet 30. Recycled water from the settling tank 26 is sprayed via pump 28 into the chamber 24 conditioning and cooling the gas stream to achieve adiabatic saturation. Spray nozzles with a large orifice diameter quench the gas stream by producing large diameter droplets. Such large droplets are unlikely to evaporate completely, thereby creating spray-dried particulate. The large nozzles also are less likely to clog. The spent' quench water is drained to the settling tank 26 for treatment and recycling. The pre-conditioned gas stream, including hydrocarbon droplets is output at channel 32 into precipitator 13.

The second stage 14 receives the gas stream into a cyclone module 34 of precipitator 13. The cyclone 34 removes any large particles such as wood fibers and large water droplets. Remaining fine mist droplets are transported with the saturated gas as the gas enters precipitator 13. The gas stream passes through distribution devices to insure even flow into collection tubes 36. As the gas enters the tubes 36, the gas passes through a series of high-intensity corona charging fields located at each disk. Within the zone between the disks and the tubes, a high electrostatic charge is imposed on the particles. The droplets and mist together from a water film which flows downward along the length of the tubes 36 aided by gravity and the flow of the gas stream. As the charged particles flow farther down the tubes 36, the electrostatic field forces the charged particles toward the tube walls. Because the fine mist droplets are large relative to the submicron particulate, the droplets are the first particles collected at the tube walls. Clean gas exits the tubes 36 into a clean air plenum, and eventually passes through a fan and up a stack for discharge into the atmosphere.

Periodically clean water from flush tank 18 is sprayed via pump 20 into the precipitator 13 to clean the tubes 36. Because the tubes 36 are continuously wetted during the precipitation and ionization steps, the collection tube surfaces are easily washed by the flush stream. The resulting flush water flows down the tubes 36, is collected in a sump 38 at the bottom of the precipitator 13, then pumped via pump 22 to the settling tank 26. Typically, the solids accumulate in the settling tank 26, then are removed by surface skimmers', bottom drag chains, aeration/flotation devices, or filters. In practice, the solids removed by these devices can achieve a texture of "pudding". For example, such collected solids typically are 15% to 25% solids by weight. Due to the large percentage of liquid material captured with the solids, waste disposal is difficult. The collected waste typically is disposed of by burning in a wet burner or boiler, or by storage in a landfill. Transporting the waste and storing the waste in a landfill is difficult when the waste includes liquid (i.e., 75% to 85% by weight).

The methods and compositions of the invention alleviate this need because, instead of transporting the flush water and solid byproduct waste to an expensive disposal facility, the flush water and waste are recycled on site at a rate which generally parallels the rate of production of solid byproduct waste by the drying operation. According to the methods of the invention, the flush water is diverted as a contaminated flush water stream from the emission control system 10, and is thereafter channeled to one of two pre-fabrication components 50 (a wood product refiner), 52 (a mixer) of a wood panel fabrication facility 11. The flush water may be diverted at lower concentrations of solids byproduct than is generally desirable when the flush water is intended to be disposed of. In particular, the methods of the invention allow for diversion of the contaminated flush water stream to the pre-fabrication refiner 50 or mixer 52 at byproduct concentration levels as low as 5% solids by weight. Preferably, the flush water stream is diverted when the stream has collected between 5%–20% solids by weight. More preferably, the stream is diverted after it has collected approximately 10% solids by weight. This avoids clogging of the spray nozzles within the recycling water system and provides other advantages as well.

The refiner 52 of the wood panel fabrication facility grades wood product to provide for a smooth surface of the finished wood panel. The mixer 52 mixes the wood product with other constituent materials (e.g. resin, wax or scavenging agents) before the wood product and other materials are pressed in press 54 to form a finished wood panel. The diverted flush water may be combined with wood product at either the refining or mixing stages. Accordingly, the diverted water may be channeled to either the refiner and mixer, where it is combined with the wood product in a pre-determined ratio of flush water to wood product.

The specific ratio of flush water to wood product is important to achieving the benefits of the invention. In particular, the flush water/wood product mixture formed according to the present invention has enhanced formaldehyde scavenging and internal bonding characteristics compared to dried wood product alone, and its use in wood panel fabrication can therefore eliminate or reduce the need for commercially provided resins or other constituent materials used to increase internal bonding strength. Suitable flush water to wood product ratios have been found to be in the range of between about 0.5 gallons to 5.0 gallons of flush water per 1,000 pounds of wood product. Preferably, the ratio is in the range of about 1.0–2.5 gallons of flush water per 1,000 pounds of wood product. More preferably, the ration is approximately 2.5 gallons of flush water per 1,000 pounds of wood product.

One important concern regarding the ratio of flush water to wood product used is that, when materials are added to the refiner 50 or the mixer 52, it is necessary to avoiding excessive increase in the overall moisture content of flush water/wood product mix. When too much moisture is added, and the mix is pressed into a wood panel, steam from the moisture rapidly expands, or blows, during the pressing step. Specifically, the board blows when the press opens and may leave panel fragments stuck to the press. If so, then the press and the fabrication line are shut down, while the press is cleaned. As a typical mill line may produce 50 semi-truck loads per day, the loss of press time for one hour or more may significantly decrease the mill output. As the mills frequently operate at slim profit margins, the decrease in productivity causes significant economic damage. By using the specific rations of flush water/wood product provided in this invention, the flush water and constituent byproduct adds sufficient adhesive qualities to offset any increased moisture content for a given operating flow rate of flush water.

Adding the flush water with byproduct to the wood panel mix provides a simple, inexpensive, safe way of reducing wastewater and byproduct disposal costs. The scavenging and resin extending attributes of the flush water are additional benefits of the recycling methods. Formaldehyde is found in wood products and typically emitted in small amounts over the useful life of commercial wood products. Typically, government regulates the amount of emissions permissible. To comply with such government regulations, wood panel fabricators include scavenging solution into the panel mix. The scavenging solution ties up the formaldehyde in compounds so as to reduce emissions over the life of the wood product. Without scavenger agents, formaldehyde emissions typically are approximately 0.40 parts per million (ppm) in processed wood (based on the industry standard large chamber formaldehyde test index). As of 1992, the U.S. Government's Agency for Housing and Urban Development (HUD) requires that formaldehyde emissions be less than 0.30 parts per million. The industry, however, desires to get the emissions below 0.20 ppm (as indexed to the industry-standard large chamber formaldehyde test) to meet toughening standards. Based upon empirical data, mills in the U.S. and abroad are able to get emissions down to approximately 0.20 ppm, although with difficulty, by adding conventional scavenging solutions. However, the expense in meeting such level is high. Using the methods of the invention, formaldehyde emissions can be reduced in fabricated wood panels significantly when flush water with byproduct is added to the wood product in the above recited ratios. This has been confirmed by empirical testing of batches of Douglas fir and Redwood wood product, where formaldehyde emissions were decreased by 0.01 ppm or more. As the industry is able to achieve near 0.20 ppm using conventional scavenging agents, the added scavenging capacity provided by the invention allows wood panel fabricators to consistently achieve less than 0.20 ppm without significant cost increases.

The methods of the invention also provide for improved internal bonding capability in a wood panel pre-mix, and overall improved bond strength in a completed panel, compared to the bonding strength obtained without adding excess resin or other bonding agents. Where bond strength is weak, the board's particle composition separates under forces that are undesirably low. Improvements in bond strength mean stronger wood panels. Empirical testing has revealed that their is an optimal ratio of flush water with byproduct to add to the wood product in the panel pre-mix to achieve increased bonding capacity and bond strengths. At other ratios significantly different from the optimal ration, the internal bond strength decreases. Using industry standard tests for measuring internal bond strength of particle board, strengths of 88 to 95 PSI were obtained without adding flush water and byproduct as constituents to panels formed from Douglas fir and Redwood wood product. When flush water is added to wood product in the above recited ratios, internal bond strength is improved to as much as 100–105 PSI.

Conventionally, resin is added to the mix during fabrication to provide the "glue" that establishes strong internal bonds. When flush water is added to wood product in the above recited ratios, internal bond strength improves. As a result, stronger wood panels are achieved. Alternatively, wood panels of similar strength can be produced using less off-the-shelf resin.

Increased bond strength means stronger panels achieved without increasing volumes of conventional resins.

According to another aspect of the invention, the addition of flush water enables a faster press time during panel fabrication. In particular, the flush water with byproduct additive enables additional moisture to be added to the panel mix without the formation of undesirable steam pockets during pressing. Because water is a good heat conductor, the added moisture speeds up the curing process for the panel. However, moisture may form steam pockets during pressing. Because of the increased pressure during pressing, some water may remain in liquid state although at a temperature above the typical boiling point. In such case, a decrease in pressure which occurs at the completion of pressing causes the water to convert to steam. The force of expansion occurring during the conversion may blow open the panel when the press is opened. Such an event is referred to as a "blow" and is undesirable. In particular, a blow may cause the production line to shut down. Often a press is used to generate 16,000 square feet of panels per hour. Loss of press time is costly. Accordingly, the addition of moisture is useful for decreasing the cure time, but at some point there is to much moisture resulting in steam pockets that can not be contained by the internal strength of the panel. The flush water with byproduct, however, adds adhesive qualities to the panel mix. The added adhesive qualities hold the additional moisture/steam in place when the press is released. Thus, more moisture and a corresponding improvement in cure time is achieved with less risk of "blows".

In an alternate embodiment of the invention, the flush water/wood product mixture is combined with other wood panel constituent materials and pressed to form a fabricated wood panel. In related embodiments, wood panel pre-mix compositions are provided for use in the production of fabricated wood panels. The compositions include contaminated flush water containing solids such as wood fibers, semi-solids, hydrocarbons and other byproducts of wood panel fabrication processes. In addition to the flush water, the composition also includes dried wood product mixed with the contaminated flush water in a pre-determined ratio of flush water to dried wood product, to form a flush water/wood product mixture having enhanced formaldehyde scavenging and internal bonding characteristics compared to the dried wood product alone. The preferred ratios of flush water/wood product in the pre-mix coincide to the preferred ratios recited above for use in conjunction with the methods of the invention.

Although preferred embodiments of the invention have been illustrated and described, various alternatives, modifications and equivalents may be used. For example, the diversion and channeling of flush water to the refiner 50 or the mixer 52 need not be a direct diversion. Alternatively, the flush water may be filtered or centrifuged to remove some of the solids in the flush water. In one potential application, the flush water can be centrifuged to remove undissolved solids, in which case a flush water/wood product ration closer to the bottom of the above recited range, i.e. approximately 0.5 gallons of flush water per 1,000 pounds of wood product may be desirable. Alternatively, the flush water may be concentrated beyond the preferred upper limit of 20% solids by weight, for instance where concentration was desired to transport the flush water before channeling it into a panel fabrication system component at a remote location. In this case, proportional adjustments could be readily determined to provide for a final flush water/wood product mix ration which would provide the desired moisture and particulate balance in the final panel pre-mix. These and other embodiments of the invention are within the scope of the invention. Therefore, the foregoing description should not be taken as limiting the scope of the invention, which is defined by the appended claims.

What is claimed is:

1. A method for recycling contaminated flush water containing byproduct of a wood panel fabrication process, the byproduct comprising solids, semi-solids, and hydrocarbons, the solids including wood fiber, the fabrication process employing an emission control system in which a water stream collects the byproduct to form the contaminated flush water, the recycling method comprising the steps of:

diverting a contaminated flush water stream from the emission control system;

channeling the diverted flush water stream into a pre-fabrication component of a wood panel fabrication facility; and combining a predetermined ratio of diverted flush water with dried wood product in the pre-fabrication component to form a flush water/wood product mixture having enhanced formaldehyde scavenging and internal bonding characteristics compared to the dried wood product alone.

2. The method of claim 1, wherein the contaminated flush water stream is diverted from the emission control system when the stream has collected between 5 and 20% solids by weight.

3. The method of claim 1, wherein the contaminated flush water stream is diverted from the emission control system when the stream has collected approximately 10% solids by weight.

4. The method of claim 1, wherein the pre-determined ratio of diverted flush water to dried wood product combined in the pre-fabrication component is in the range of between 0.5 and 2.5 gallons of flush water to 1,000 pounds of wood product.

5. The method of claim 1, wherein the pre-determined ratio of diverted flush water to dried wood product combined in the pre-fabrication component is in the range of between 1.0 and 2.5 gallons of flush water to 1,000 pounds of wood product.

6. The method of claim 1, wherein the pre-determined ratio of diverted flush water to dried wood product combined in the pre-fabrication component is approximately 2.5 gallons of flush water to 1,000 pounds of wood product.

7. A method for manufacturing a fabricated wood panel using contaminated flush water containing byproduct of a wood panel fabrication process, the byproduct comprising solids, semi-solids, and hydrocarbons, the solids including wood fiber, the fabrication process employing an emission control system in which a water stream collects the byproduct to form the contaminated flush water, the manufacturing method comprising the steps of:

diverting a contaminated flush water stream from the emission control system;

channeling the diverted flush water stream into a pre-fabrication component of a wood panel fabrication facility; and combining a pre-determined ratio of diverted flush water with dried wood product in the pre-fabrication component to form a flush water/wood product mixture having enhanced formaldehyde scavenging and internal bonding characteristics compared to the dried wood product alone combining the water/wood product mixture with other wood panel constituent materials; and press the flush water/wood product mixture and other constituent materials in a wood panel press to form a fabricated wood panel.

8. The method of claim 7, wherein the contaminated flush water stream is diverted from the emission control system when the stream has collected between 5 and 20% solids by weight.

9. The method of claim 7, wherein the contaminated flush water stream is diverted from the emission control system when the stream has collected approximately 10% solids by weight.

10. The method of claim 7, wherein the pre-determined ratio of diverted flush water to dried wood product combined in the pre-fabrication component is in the range of between 0.5 and 2.5 gallons of flush water to 1,000 pounds of wood product.

11. The method of claim 7, wherein the pre-determined ratio of diverted flush water to dried wood product combined in the pre-fabrication component is in the range of between 1.0 and 2.5 gallons of flush water to 1,000 pounds of wood product.

12. The method of claim 7, wherein the pre-determined ratio of diverted flush water to dried wood product combined in the pre-fabrication component is approximately 2.5 gallons of flush water to 1,000 pounds of wood product.

* * * * *